Nov. 2, 1965  R. E. FERGUSON  3,215,345
APPARATUS FOR SEVERING GLASS ARTICLES BY THERMAL SHOCK
Filed Feb. 6, 1963  3 Sheets-Sheet 1
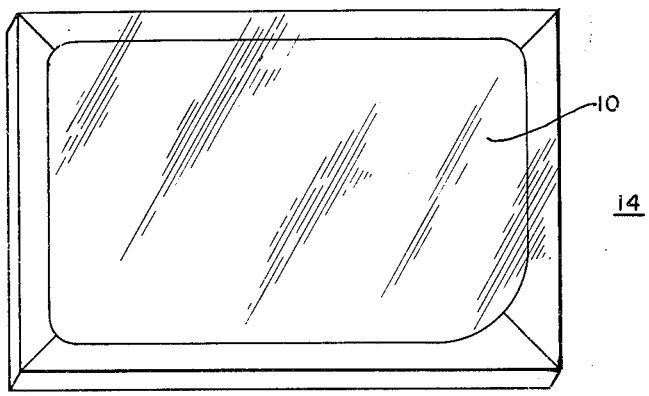
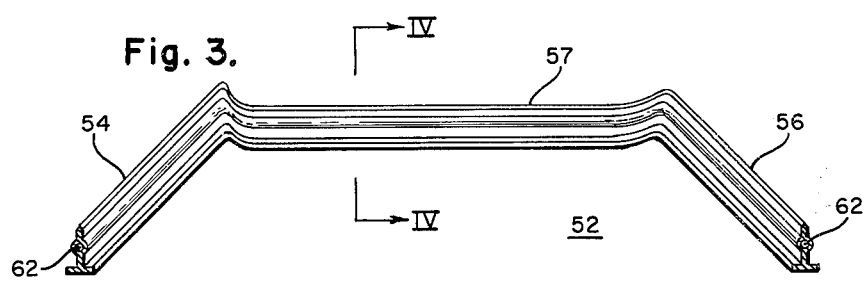
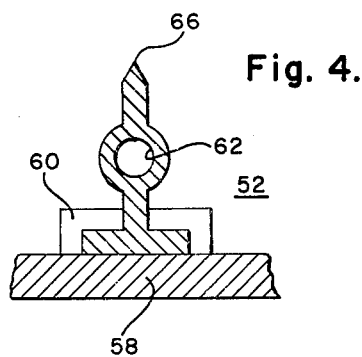
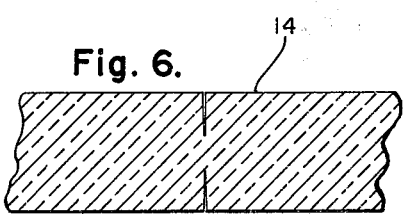
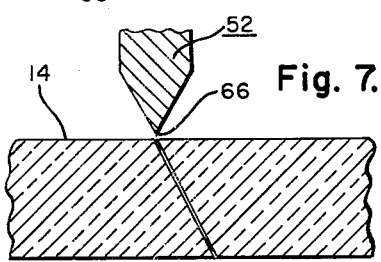
INVENTOR.
ROBERT E. FERGUSON
BY John A. Young
his ATTORNEY Nov. 2, 1965 R. E. FERGUSON 3,215,345
APPARATUS FOR SEVERING GLASS ARTICLES BY THERMAL SHOCK
Filed Feb. 6, 1963 3 Sheets-Sheet 2

INVENTOR.
ROBERT E. FERGUSON
BY John A. Young
his ATTORNEY.

United States Patent Office 3,215,345
Patented Nov. 2, 1965

1

3,215,345
APPARATUS FOR SEVERING GLASS ARTICLES
BY THERMAL SHOCK
Robert E. Ferguson, c/o Ferguson Fabrication Co., MR 10,
P.O. Box 9, Kittanning, Pa.
Filed Feb. 6, 1963, Ser. No. 256,650
7 Claims. (Cl. 225—93.5)

This invention relates to apparatus and methods for producing glass articles, and more particularly to methods and apparatus for transporting and cutting irregularly shaped articles from glass sheet stock.

When glass is cut by abrasion wheels or the like, which is a common practice is producing articles, there are generated many small chips or splinters of glass which, if not removed from the site of operation, can produce a scoring effect on the surface of the glass thereby marring the finish and increasing the amount and frequency of glass scrappage. Also, the edge which is produced by grinding or cutting with abrasive members is irregular and must be finished by some suitable smoothing operation, as for example, by frictionally abrading the edge in any one of several suitable manners. These operations are expensive to employ and they also hamper the rate of producing these articles, therefore, additional cost is added to the article.

In order to overcome the described problems of mechanically cutting glass, there have developed numerous attempts at effecting a controlled fracture of glass sheet stock along a prescribed path, by employing a thermally induced shock within the glass and in this manner causing the article to be snapped out of the sheet stock. The fracture line is caused to closely follow a prescribed contour in accordance with the finished product or it is, of course, unsatisfactory.

Thus far, these thermally-induced shock methods have proved unsatisfactory because the method for handling the glass has not been suitably coordinated with the operation of severing the glass; the thermally induced shock methods are unsatisfactory because of dimensional changes which take place within the thermal elements as they are heated or cooled and therefore the object produced tends to deviate from the prescribed tolerances. Many other obstacles are encountered such as requiring a change in the shape of the shock-producing elements when articles of different configuration or size are required, and a still further deficiency applies in the inability of the presently practiced methods to achieve fracture when the article either changes gauge or is non-planar at its opposite faces.

Accordingly, it forms one of the principal objects of the present invention to correct the foregoing deficiencies by providing a method and apparatus for handling glass which is in sheet stock form and is quickly and reliably transported without producing any injury to the face of the glass.

A further object of the present invention is to provide new and improved processes and apparatus for severing articles from glass sheet stock by means of thermally induced shock fracture and which can be used regardless of variations in the planar shape of the opposite glass surfaces.

It is a further object of the present invention to provide a new and improved method for transporting glass which safeguards the glass against any marring of the surface by glass chips or other foreign material, by reason of the novel vertical support through a fluid medium and also, in one embodiment, by effecting propulsion of the glass by a fluid medium.

A still further object of the present invention is to provide a novel method for severing articles of a desired contour from glass, by thermal shock means which is adapted for glass of different cross sectional thickness and wherein the thermal shock can be used to effect both a complete or partial severance. In the case of partial severance the remaining severance is either by auxiliary means employing vibrational force or by suitable auxiliary thermal elements.

A still further object of the present invention is to employ thermal shock-producing elements which are less susceptible to deformation under change of temperature, which can be readily formed to different configurations and sizes required, and will hold such configuration more accurately in spite of expansions and contractions which take place in the thermal element during usage. The object is achieved in part by a novel combination of thermal element sectors which are formable in complementary sections and together make a composite outline of the article.

Other objects and features of the present invention will become apparent from a consideration of the following description, which takes place in connection with the accompanying drawings, wherein examples of the invention are selected by way of illustration. In the drawings:

FIGURE 1 is an isometric view of the glass stock showing in outline the contour of the product which is constructed therefrom;

FIG. 3 is a detail view of the thermal-shock producing elements;

FIG. 4 is a section view taken on line IV—IV in FIG. 3;

FIG. 6 is an enlarged section view of the glass stock shown partially severed;

FIG. 7 illustrates how the glass fracture can occur along an inclined fracture path by offsetting the thermal elements;

Figure 2:
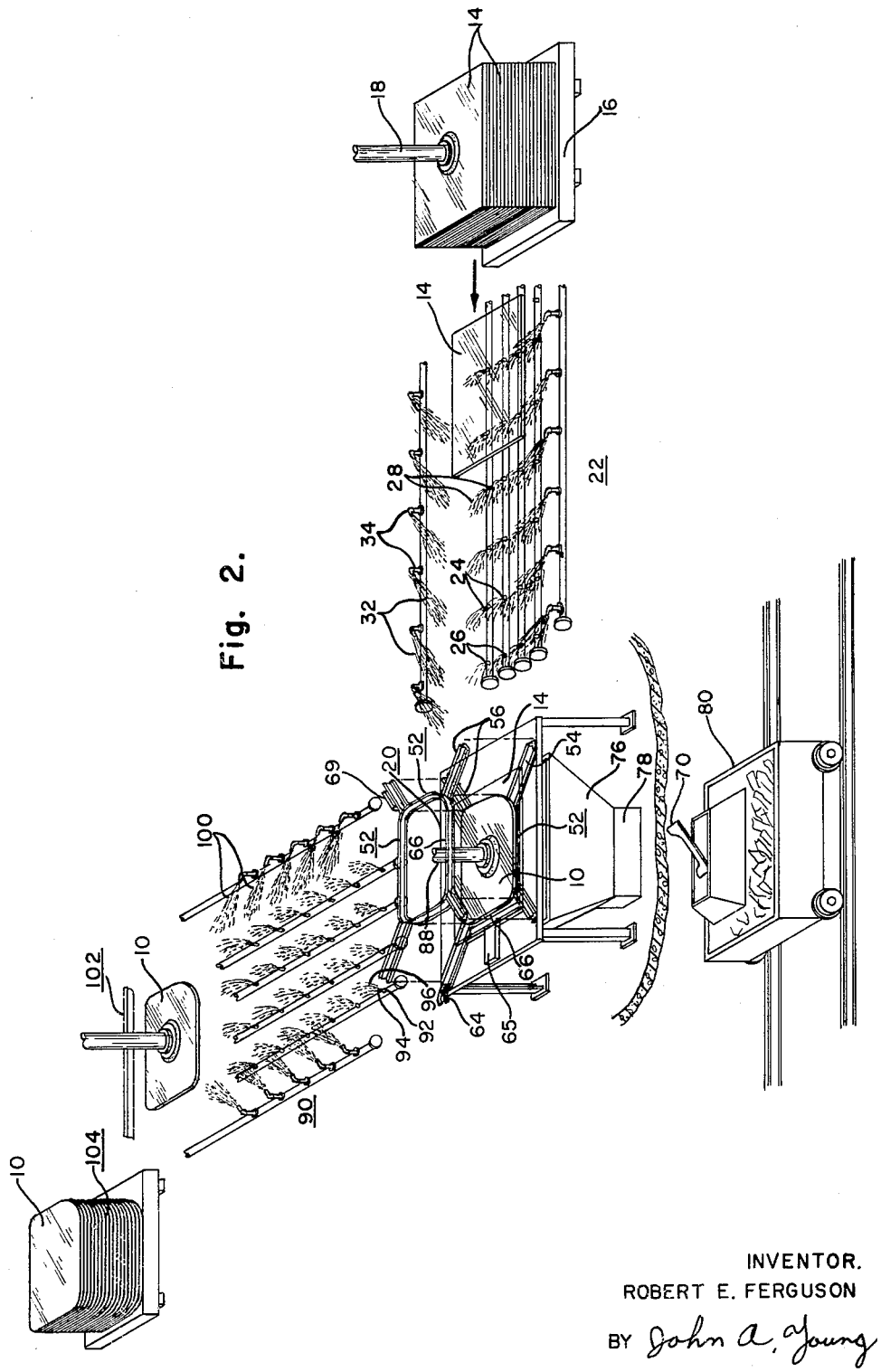
FIG. 2 is an isometric schematic view showing the flow of material, its method of conveyance and formation of the article.

Referring now to the drawings, the article which is intended to be formed, may consist of a section 10 (FIG. 1) of irregular outline which is used, in the making of windshields for automobiles and the like. The invention is not, of course, limited to any particular shape, outline or size and in fact the major benefit of the invention is that the shape, outline and size can be varied at will to produce a given article.

The article is made from glass sheet stock which is provided, in the illustration, as a number of individual glass plates 14 which are stacked on pallets 16 at a convenient location in relation with a suction cup lift mechanism 18. The glass plates are conveyed to severing station 20 by means of a conveyor 22 having spaced nozzles 24 with orifices 26 which direct jets 28 of fluid such as water upwardly against the undersurface of the plate stock, and provide vertical support for the stock. There is a slight inclination to the jets to impart a forward thrust to the plate stock in addition to providing vertical support. The force of the jet determines the elevation of the stock during transport. The jet force is also varied in accordance with the weight of the stock, i.e., the heavier the stock the more pressure is used in the jet stream to effect the support. Additional jets 32, which are derived from nozzles 34, and are directed against the edges of the stock, impart a translating effect on the stock plates causing them to move forwardly to the severing station as indicated by the arrow in FIGURE 1. The lateral jets 32, which are developed from the nozzles 34, can change their vector force by controlling the angular location of the nozzles to thereby position the plates. The forward velocity is variable depending on the angularity of the lateral nozzles; for example, for maximum forward velocity of the plates, the nozzles are inclined to their maximum extent in the direction of the line of travel of the plates. Braking effort can be effected on the plates by reversing the angularity of the nozzles 34. The angularity of the nozzles 34 is coordinated with the severing operation so that glass plates are provided as they are needed. Servo control can be provided in many ways other than the one shown but in this illustration I utilize an open center control valve 42, pump 44 and motor 46. A suitable signal is received from the severing station to displace the control valve 42 and thereby move the double acting piston 50 in one direction or the other to actuate the motor 46 which defines the angular position. The angular position of the nozzles is established by a servo system having a feedback signal from the glass severing station so that the glass plates are provided at whatever schedule is required. The angular position of the nozzles, as described, is established by the motor 46 through its piston 50 which is operatively connected with the nozzle 34 and, is actuated by open center control valve 42 suitably connected with a pump 44, the open center valve being moved to the right or to the left by solenoid 50 in accordance with the suitable signal obtained from the glass forming station 20. Thus, when the station 26 communicates information indicating a fast rate of glass cutting this signal is translated to the open center valve causing the nozzles to assume an extreme angle wherein the vector is aligned with the line of travel of the glass plates and a high speed of translation is provided. Also, should the glass forming operation be slowed, the nozzles 32 are moved so that the jets 32 impinge more perpendicularly to the glass plates causing them to slow in their forward speed. Braking of the plates can be accomplished by reversing the angularity of the nozzles causing them to stop or to reverse their line of travel.

When the glass plates reach the severing station 20, their opposite faces are engaged by glass-severing thermal elements 50 which are constructed in sectors 52, each of which provides a portion of the outline defining the contour of the article. The ends 54, 56 of the sectors are free to expand outwardly or contract inwardly so that the portion 57 defining the contour of the article is unaffected by expansion or contraction deformation. A platen 58 is used as a mounting structure for the sectors 52 and hangers 60, FIG. 4, are used for supporting the sectors on the upper and lower platens 58 and permit complete support of the sectors. The sectors are at least semi-resilient and are readily formable to define other contours and dimensions as required.

The sectors 52 can be constructed of aluminum or the like which is not adversely affected by great extremes of temperature. The interior of each sector is hollow and has a conduit 62 for receiving refrigerant therein, such as liquid nitrogen, the refrigerant being circulated from one sector to the other by readily attachable and detachable conduit sections 64 whereby coolant is circulated from one condiut section to the next. The extending sectors are used for forming crack-out lines extending from the center of the plate stock to the corners and facilitating separation of the article from the stock.

Figure 8:
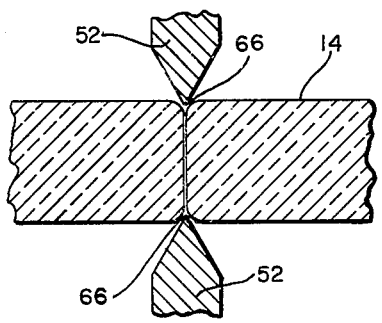
FIG. 8 illustrates how the edge of the fracture can be rounded by engaging the thermal elements with the surface of the glass; and, FIG. 9 is a schematic view of the servo system for effecting propulsion force on the glass stock in accordance with the feedback signal from the glass forming operation.
Figure 5:
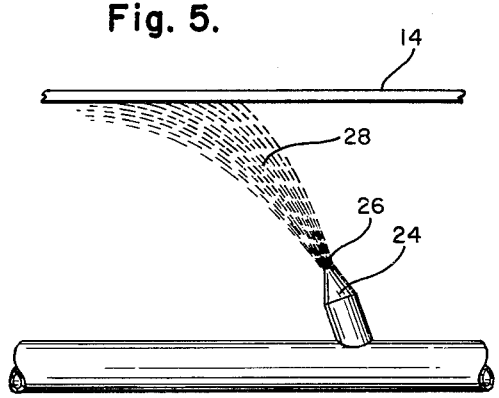
FIG. 5 is a detail view of the conveying means which are in the form of jets of water which provide vertical support when directed upwardly against the undersurface of the glass stock.
Figure 9:
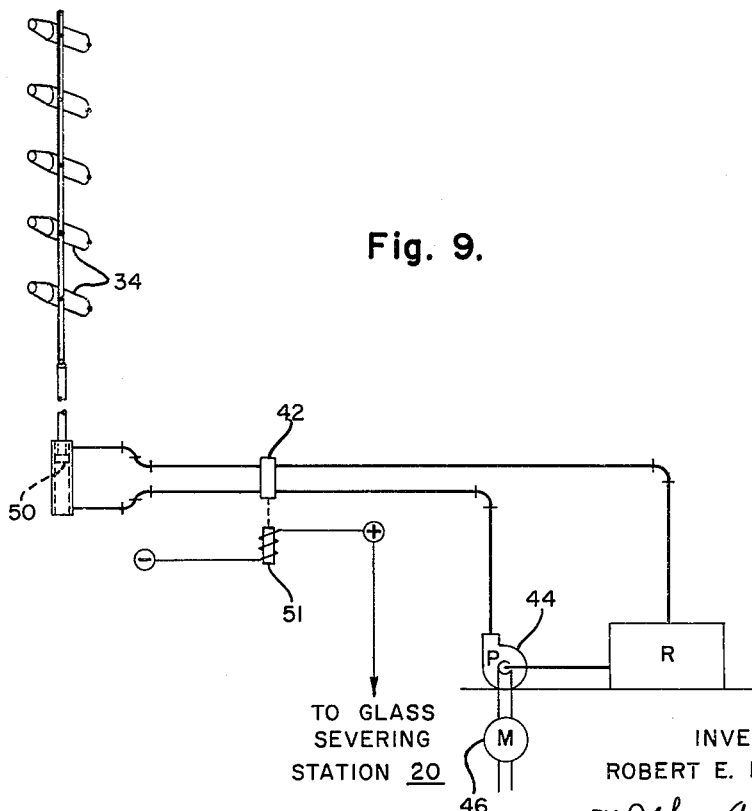

The respective sector sections which define the outline of the article meet closely at their ends so that there is only a slight bridged section of glass unseversed by the elements when they are brought into proximity with the plate stock. From the cross section of the elements (FIG. 4) there is a knife edge 66 which localizes the extreme heat or extreme cold to a prescribed location at the face of the glass stock to impart a very low temperature or high temperature to the stock and thereby produce a thermal shock which effects a cleavage starting at opposite sides of the stock and migrating quickly from opposite directions toward each other. Where the gauge of the glass is thin enough, the migrating cleavages intersect and the article separates from the remainder of the stock. The cullet 70 falls into a collecting bin 76 and then through a chute 78 to a container 80 where it is returned for further glass manufacturing purposes. When it is desired to make the cleavage perpendicular to the face of the stock, the edges 66 of the elements 52 at the opposite side of the stock are superimposed; but, the edge can be beveled (FIG. 7) in one direction or the other by offsetting the edges 66 of the elements 52 at the opposite faces of the stock. Also, the edge corners where the severance occurs can be made either sharp or rounded by bringing the knife edge of the element 50 slightly displaced from the stock (FIG. 7) or by bringing it into actual contact with the stock, (FIG. 8) a rounding effect is obtained, particularly where the element is a heated element and not a refrigerated element.

The principle employed in each of the thermal shock means of severance is to use elements 52 which are at a substantial temperature differential from the glass stock 14. In achieving this, I can use, with substantially equivalent results, refrigerated elements 52 or heated elements 52 or a combination of one heated element and one refrigerated element. Also, the stock 14 can be refrigerated and both elements 52 heated or the converse can be used, i.e., the glass stock is heated and the elements 50 refrigerated. All of these combinations are within the teaching of the present invention.

If the thickness of the glass is such that fracture starting from the opposite faces does not intersect (FIG. 6), then the remainder portion is fractured by auxiliary means such as a vibrator mechanism 66 which produces a high frequency vibration within the stock and such vibration continues the fracture along the cleavage plane initiated by the thermal shock elements 52 and completes separation of the article from the stock. Other auxiliary separating mechanism are usable such as laser devices which will focus wave energy at the unsevered area severing the article from the stock. The laser is well known in principle in operation and reference may be had for details of the laser construction to U.S. Patent No. 2,929,922, Schlow, et al., issued March 22, 1960. The laser construction per se does not form part of the present invention.

Although the glass stock contains both surface irregularities and to some extent has a warpage to it, it can nevertheless be severed in the manners described by the "line contact" of the thermal elements because water or other liquid material which serves as the transporting mechanism produces, by its surface tension, a planar condition to the stock causing it to receive a uniform thermal shock effect from the knife edges of the elements 52.

Thus, any non-planar variations which occur in the plate stock tends to become planar by the film of water or the like which adheres to the face of the stock and then communicates a shock effect uniformly through the cross section of the stock.

When the article is separated or severed from the stock the cullet is disposed of as described and the suction cup 88 lifts the severed particle onto a conveyor 90 having nozzles 92 with orifices 94 and jets 96 directed against the undersurface of the article. The lateral jets 100 center the stock and propel it at the desired speed to a bending station 102 after the article has been suitably dried. In another application, the article is transferred to a storage 104 where it is packed or stored until needed.

The operation as described is particularly advantageous because should any fragments of glass be generated during the severing operation, such pieces fall downwardly and cannot mar the surface of the article. The conventional method of transporting glass is with friction wheels which bear against the faces of the glass stock and should these friction wheels collect any fragments of glass then they mar the surface causing extensive damage. The liquid transporting medium described obviates these difficulties and is ideally suited for handling substantial quantities of glass at a rate which is coordinated with the glass severing operation. Moreover, the fluid film at the surface of the glass facilitates thermal shock methods of severing the glass.

In operation, a stack of glass plate stock 14 is transported on pallets 16 to a convenient location in relation to conveyor 22 and according to the weight and height at which the glass is transported, the discharge velocity of jets 28 in the conveyor is adjusted to provide a vertical support cushion for the glass stock 14 and the stock 14 is then caused to move on this cushion in the direction of the arrow toward the severing station 26. The velocity of the plate glass is determined by the force of flow and angularity of nozzles 34 which direct the spray against the edges of the stock.

Once the stock has reached a severing station, the opposite faces are exposed to the elements 52 which are brought together. The knife edges 66 of the elements communicate a substantial temperature differential to these opposite stock faces, being either cooled to a substantially lower temperature or heated to a substantially higher temperature and causing a highly stressed condition within the glass which produces a cleavage through the thickness of the glass starting from the opposite faces and migrating together and, in the event that the thickness of the glass is not too great, the cleavages intersect and the article separates. The quality of the cut edge is modified by actually engaging the knife edges 66 of the elements 52 with the stock or by holding them slightly displaced. The cut edges can be beveled or straight by causing the elements at the opposite sides of the stock to be superimposed or slightly offset.

In the event that the contour or size of the article is to be changed, the elements 50 can be readily shaped to whatever size it is desired in accordance with the configuration of the article to be made from the stock. Where the ends of the sectors meet, there is a slight bridge of glass but the thermal shock migrates not only through the thickness of the glass but also from one sector to the adjoining sector, therefore fracturing this slight portion also. Where the sector ends 54, 56 project, the stock is additionally broken along these lines, thus reducing the stock elements to a convenient cullet form.

The suction cup lift 88 at the center of the severed article retains the severed article and transports it to the second conveyor 90 which then transports the finished article either to subsequent forming operations or to storage, the second conveyor 90 being the same in operation as the first conveyor 22 in order to transport the article at the desired speed.

While the present invention has been illustrated in connection with certain example embodiments thereof, it will be appreciated that these are illustrative of the invention and are by no means restrictive thereof. It is reasonably to be expected that those skilled in this art can make numerous revisions and adaptations of the invention and it is intended that such revisions and variations of the invention which incorporate the disclosed principles, will be included within the scope of the following claims as equivalents of the invention.

I claim:

1. Apparatus for cutting articles having irregular shape from sheet glass stock, comprising: transferral means for removing stock in individual glass stock elements from storage to provide an intermittent flow of material at a controllable rate; means for conveying said stock to a location for cutting, and means for severing the article to a predetermined shape from said stock and including a plurality of individually formable elements each having flexible and bendable portions adapted to set at a prescribed shape and forming a composite outline of the article to be severed from said stock, and means for communicating thermal shock to the stock through said formable elements and thereby effecting severance of the article having the outline in accordance with that defined by said complementary elements.

2. The apparatus in accordance with claim 1 including: pumping means for communicating a flow of refrigerant through said elements and effecting therein a substantially reduced temperature which produces thermal shock.

3. The apparatus in accordance with claim 1 including: means for increasing the temperature of one of said elements to induce a condition of thermal shock within the stock.

4. The apparatus in accordance with claim 1 wherein: one of said elements is heated and the other chilled to effect a temperature gradient within the glass stock sufficient to produce a severance of the stock.

5. The apparatus in accordance with claim 1 including: vibration-producing means for imparting vibratory forces to the stock and thereby produce fracture of any section unbroken by thermal shock to release the article from its associated stock piece.

6. The apparatus in accordance with claim 1 wherein: said means for transferring stock is in the form of a plurality of jets of fluid which are directed upwardly against the surface of the stock to provide vertical support therefor.

7. The apparatus in accordance with claim 6 including: means for receiving residual fluid from the surface of the workpiece after it is severed from stock and is thereafter in form for shaping or storage.

References Cited by the Examiner
UNITED STATES PATENTS

| | | | |
|---|---|---|---|
| 1,280,139 | 10/18 | Bolin | 65—182 |
| 1,900,781 | 3/33 | Wardley. | |
| 2,146,373 | 2/39 | Keier | 225—93.5 |
| 2,169,687 | 8/39 | Fowler et al. | 225—93.5 |
| 2,521,352 | 9/50 | Dockerty et al. | 225—93.5 |
| 2,956,717 | 10/60 | Scharf | 225—1 |

ANDREW R. JUHASZ, *Primary Examiner.*

WILLIAM W. DYER, *Examiner.*